(12) United States Patent
Stanek et al.

(10) Patent No.: US 9,505,405 B2
(45) Date of Patent: Nov. 29, 2016

(54) REAR COLLISION AVOIDANCE AND MITIGATION SYSTEM

(71) Applicant: Ford Global Technologies, LLC, Dearborn, MI (US)

(72) Inventors: Joseph F. Stanek, Northville, MI (US); Tobias John Pallett, Farmington, MI (US); Sarra Awad Yako, Allen Park, MI (US); Mark Davison, Dearborn, MI (US); Mark Douglas Malone, Canton, MI (US); Mathew Alan Boesch, Plymouth, MI (US); John A. Lockwood, Canton, MI (US); Hsin-hsiang Yang, Ann Arbor, MI (US); Kwaku O. Prakah-Asante, Commerce Township, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/598,495

(22) Filed: Jan. 16, 2015

(65) Prior Publication Data

US 2016/0207530 A1 Jul. 21, 2016

(51) Int. Cl.
*B60W 30/09* (2012.01)
*B60R 22/48* (2006.01)
*B62D 6/00* (2006.01)
*B60T 7/22* (2006.01)

(52) U.S. Cl.
CPC .............. *B60W 30/09* (2013.01); *B60R 22/48* (2013.01); *B60T 7/22* (2013.01); *B62D 6/00* (2013.01); *B60T 2201/022* (2013.01); *B60T 2201/024* (2013.01)

(58) Field of Classification Search
CPC ........ B60W 30/09; B60R 22/48; B60T 7/22; B62D 6/00
USPC .......................................................... 701/42
See application file for complete search history.

(56) References Cited

U.S. PATENT DOCUMENTS 4,435,000 A 3/1984 Chiba et al.
5,594,414 A * 1/1997 Namngani ............. B60Q 9/008
180/168

(Continued)

FOREIGN PATENT DOCUMENTS

CN 103029666 A 4/2013
DE 102013021270 A1 7/2014

(Continued)

OTHER PUBLICATIONS

UK Search Report dated Aug. 3, 2016 (5 pages).

*Primary Examiner* — Anne M Antonucci
(74) *Attorney, Agent, or Firm* — Frank A. MacKenzie; Bejin Bieneman PLC

(57) ABSTRACT

Data is collected from vehicle sensors to generate a virtual map of objects proximate to the vehicle. Based on the virtual map, an in-vehicle computer determines a traffic condition in front of and behind a host vehicle. The in-vehicle computer determines collision avoidance maneuvers. The computer instructs vehicle control units to implement the collision avoidance maneuvers. The computer may additionally or alternatively communicate the collision avoidance maneuvers to a driver via an interface. In the case of unavoidable collisions, the computer determines and initiates damage mitigation actions.

19 Claims, 8 Drawing Sheets

(56) References Cited

U.S. PATENT DOCUMENTS

| | | | |
|---|---|---|---|
| 6,393,362 B1* | 5/2002 | Burns | G05D 1/0278 340/940 |
| 7,209,050 B2 | 4/2007 | Corcoran, III | |
| 7,493,200 B2 | 2/2009 | Takahashi et al. | |
| 7,686,118 B2 | 3/2010 | Akaba et al. | |
| 8,204,678 B2 | 6/2012 | Matsuno | |
| 9,318,020 B2* | 4/2016 | Salomonsson | G08G 1/096725 |
| 2007/0005609 A1 | 1/2007 | Breed | |
| 2009/0265107 A1 | 10/2009 | Matsuno | |
| 2010/0280726 A1 | 11/2010 | Stabrey | |
| 2011/0160950 A1 | 6/2011 | Naderhirn et al. | |
| 2011/0178710 A1 | 7/2011 | Pilutti et al. | |
| 2013/0030651 A1 | 1/2013 | Moshechuk et al. | |
| 2013/0338877 A1 | 12/2013 | Strauβ | |
| 2014/0222280 A1* | 8/2014 | Salomonsson | G08G 1/167 701/28 |
| 2016/0207530 A1 | 7/2016 | Stanek et al. | |

FOREIGN PATENT DOCUMENTS

| | | |
|---|---|---|
| JP | H05105046 A | 4/1993 |
| JP | 2005313708 A | 11/2005 |
| JP | 2008213581 A | 9/2008 |
| JP | 2008290600 A | 12/2008 |
| JP | 2011240852 A | 12/2011 |

* cited by examiner

REAR COLLISION AVOIDANCE AND MITIGATION SYSTEM

BACKGROUND

Avoidance and mitigation of frontal collisions while driving a vehicle sometimes requires hard braking. However, attempts to avoid frontal collisions may cause, or may increase the severity of, a rear collision occurring as part of the same event. Rear collisions may also occur due to another vehicle approaching the vehicle from behind at too great of a speed. Existing mechanisms may not adequately account for speeds, speed changes, and other behaviors that can lead to rear-end and/or frontal collisions. This is particularly true in environments where vehicles that are operated autonomously or semi-autonomously, e.g., with no or limited driver intervention, share a roadway with one another and/or with vehicles that are operated manually, i.e., according to conventional driver inputs to accelerator and brake pedals, to a steering wheel, etc.

DRAWINGS

DETAILED DESCRIPTION

System Overview

Figure 1:
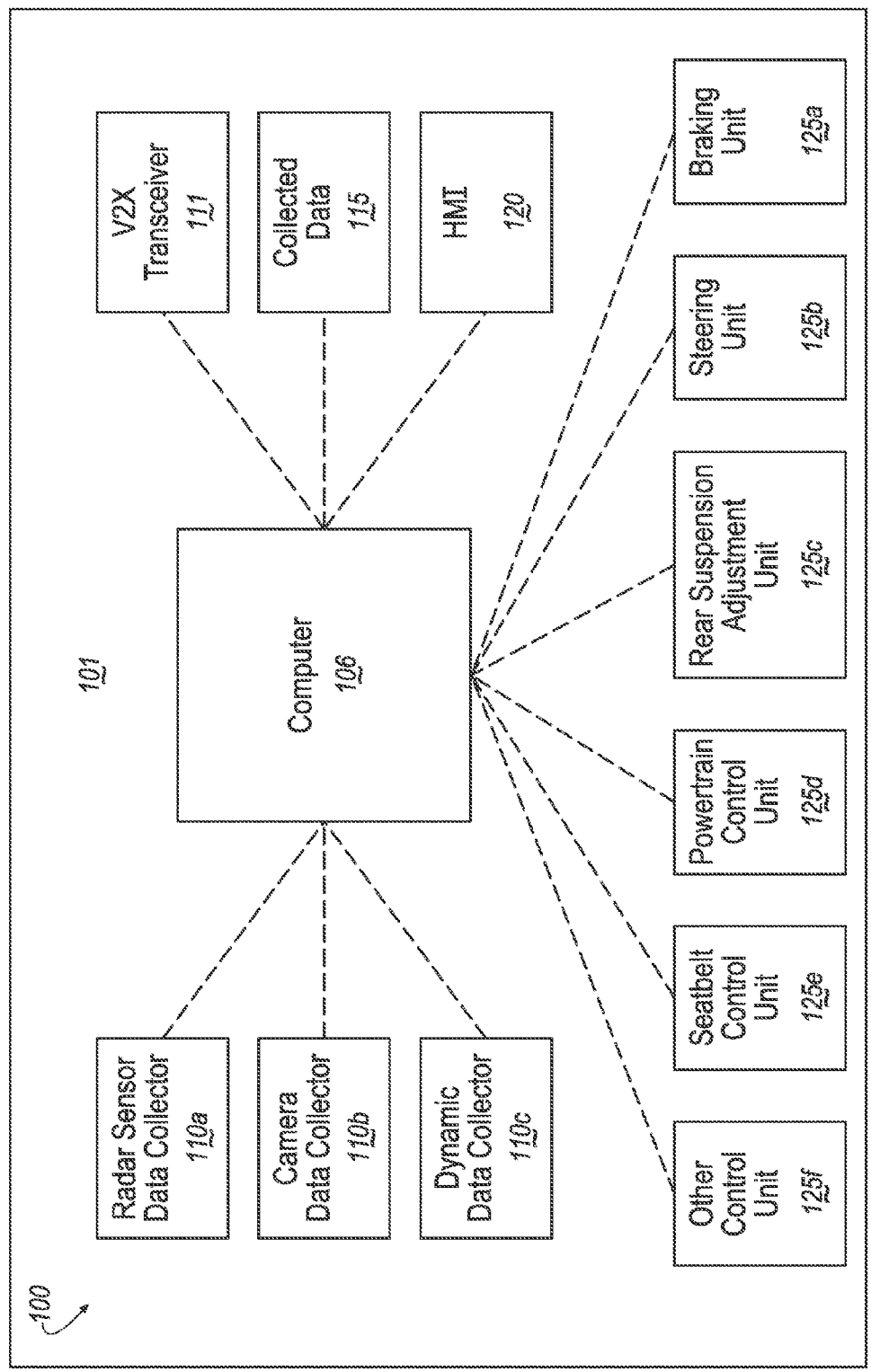
FIG. 1 is a block diagram of an exemplary collisions avoidance and mitigation system in a vehicle.

FIG. 1 is a block diagram of an exemplary collision avoidance and mitigation system 100 in a vehicle 101. The host vehicle 101, i.e., a vehicle 101 that includes the system 100, generally includes one or more sensor data collectors 110, e.g., radar sensors 110*a* and/or video cameras 110*b*, that may be used to provide data 115 to a vehicle computer 106 during a host vehicle 101 driving operation. The host vehicle 101 may further include one or more v2x (vehicle-to-vehicle (v2v) or vehicle-to-infrastructure (v2i)) transceivers 111 that may provide data 115 to the vehicle computer 106 during the host vehicle 101 driving operation. Vehicle-to-infrastructure communications may include communication with transceivers associated with road infrastructure such as stop signs, street lights, lane indicators, etc. Vehicle-to-infrastructure communications may further include, for example, network communications through the internet and/or computing resources offered as utilities (the cloud).

Advantageously, the computer 106 may be configured to use the data 115 to detect objects proximate to, e.g., within a predetermined distance of, the predetermined distance possible corresponding to a direction with respect to the vehicle (e.g., to the side, to the front, etc.), the host vehicle 101 during the driving operation, and moreover may be configured to evaluate a risk of a rear and/or a front collision to the host vehicle 101 during the driving operation. Yet further, the computer 106 may be programmed to provide an alert via a human machine interface (HMI) 120 in the host vehicle 101. Even further, the computer 106 may be programmed to provide an instruction to one or more control units 125 in the host vehicle 101 to avoid or mitigate the damage of a pending collision, e.g., to a braking control unit 125*a* to apply brakes, a steering control unit 125*b* to control a steering angle of the host vehicle 101, a suspension control unit 125*c* to adjust a height of a suspension, an powertrain control unit 125*d* to control propulsive torque at host vehicle 101 wheels, a seat belt control unit 125*e* to pretension seat belts, and other control units 125*f*.

Exemplary System Elements

As stated above, a host vehicle 101 includes a vehicle computer 106. The host vehicle 101 is generally a land-based vehicle having three or more wheels, e.g., a passenger car, light truck, etc. The host vehicle 101 has a front, a rear, a left side and a right side, wherein the terms front, rear, left and right are understood from the perspective of an operator of the host vehicle 101 seated in a driver's seat in a standard operating position, i.e., facing a steering wheel. The computer 106 generally includes a processor and a memory, the memory including one or more forms of computer-readable media, and storing instructions executable by the processor for performing various operations, including as disclosed herein. Further, the computer 106 may include and/or be communicatively coupled to more than one other computing device, e.g., control units or the like included in the host vehicle 101 for monitoring and/or controlling various vehicle components, e.g., the brake control unit 125*a*, steering control unit 125*b*, suspension control unit 125*c*, etc. The computer 106 is generally programmed and arranged for communications on a controller area network (CAN) bus or the like.

The computer 106 may also have a connection to an onboard diagnostics connector (OBD-II), a CAN (Controller Area Network) bus, and/or other wired or wireless mechanisms. Via one or more such communications mechanisms, the computer 106 may transmit messages to various devices in a vehicle and/or receive messages from the various devices, e.g., controllers, actuators, sensors, etc., including data collectors 110 and control units 125. Alternatively or additionally, in cases where the computer 106 actually comprises multiple devices, the CAN bus or the like may be used for communications between devices represented as the computer 106 in this disclosure. In addition, the computer 106 may be configured for communicating with other devices via various wired and/or wireless networking technologies, e.g., cellular, Bluetooth, a universal serial bus (USB), wired and/or wireless packet networks, etc.

A memory of the computer 106 generally stores collected data 115. Collected data 115 may include a variety of data collected in a host vehicle 101 by data collectors 110 and/or derived therefrom. Examples of collected data 115 are provided above, and in particular may include measurements of ranges (sometimes referred to as distances herein), range rates (rate of change of ranges), velocities, types, dimensions, makes, models, etc. of surrounding vehicles. Data 115 may additionally include data calculated therefrom in the computer 106. In general, collected data 115 may include any data that may be gathered by a collection device 110, received through v2x communications, collected or received from other sources, and/or computed from such data.

As described in detail below, the computer 106 may be programmed to generate a virtual map of objects surrounding the host vehicle 101. The virtual map may include any of the collected data 115, including the range of other objects relative to the host vehicle 101, the range rate of the other objects, type of object, type of vehicle etc.

Generally, each of the control units 125 may include a processor programmed to receive instructions from the computer 106, execute the instructions, and send messages to the computer 106. Further, each of the control units 125 may include an actuator capable of receiving instructions from the processor and performing an action. For example, the brake control unit 125a may include a processor and a pump for adjusting a pressure of brake fluid. In this example, upon receiving an instruction from the computer 106, the processor may activate the pump in order to provide power assist or initiate a braking operation.

Further, the control units 125 may each include sensors arranged to provide data to the computer 106 regarding vehicle speed, vehicle steering angle, height of a suspension, etc. For example, the brake control unit 125a may send data to the computer 106 corresponding to the brake pressure being applied by the brake control unit 125a.

As mentioned above, the host vehicle 101 may include one or more v2x transceivers 111. The v2x transceiver 111 generally supports v2x communications with other vehicles (v2v) or infrastructure (v2i) as is known.

Various technologies, including hardware, communication protocols, etc., may be used for v2x communications. For example, v2x communications as described herein are generally packet communications and could be sent and received at least partly according to Dedicated Short Range Communications (DSRC) or the like. As is known, DSRC are relatively low-power operating over a short to medium range in a spectrum specially allocated by the United States government in the 5.9 GHz band.

A v2x communication may include a variety of data concerning operations of a vehicle 101. For example, a current specification for DSRC, promulgated by the Society of Automotive Engineers, provides for including a wide variety of vehicle 101 data in a v2v communication, including vehicle 101 position (e.g., latitude and longitude), speed, heading, acceleration status, brake system status, transmission status, steering wheel position, etc.

Further, v2x communications are not limited to data elements included in the DSRC standard, or any other standard. For example, a v2x communication can include a wide variety of collected data 115 including position, velocity, vehicle make, model, etc. of another vehicle 160 (see FIG. 4) proximate the host vehicle 101.

Data collectors 110 may include a variety of devices. For example, as illustrated in FIG. 1, data collectors 110 can include radar sensors 110a, video cameras 110b, and/or data collectors 110c that collect dynamic host vehicle 101 data, such as velocity, yaw rate, steering angle, etc. Further, the foregoing examples are not intended to be limiting; other types of data collectors 110, for example accelerometers, gyroscopes, pressure sensors, etc., could be used to provide data 115 to the computer 106.

Figure 2:
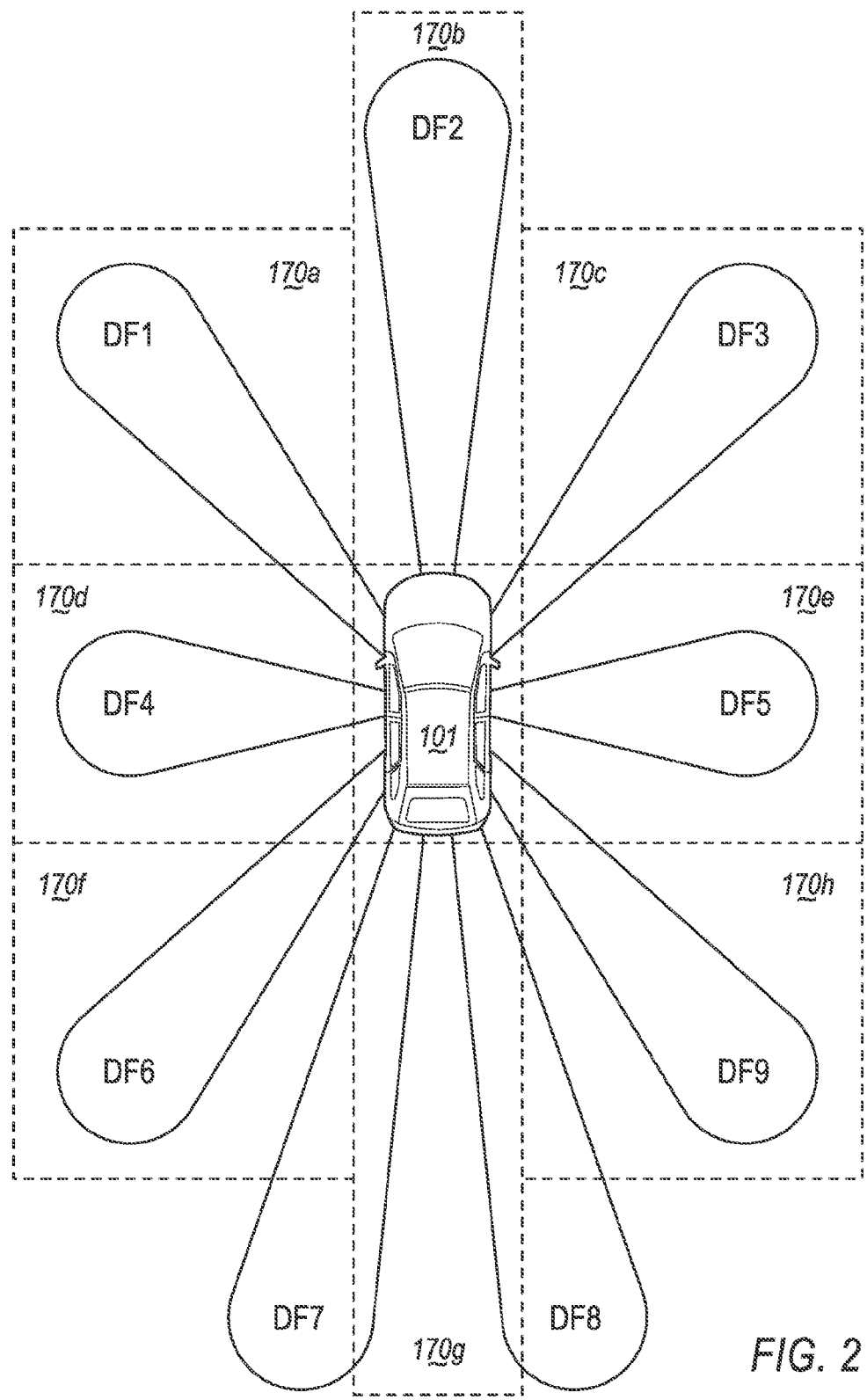
FIG. 2 is a top view of an exemplary vehicle equipped for collision avoidance and damage mitigation illustrating exemplary radar detection fields.

An exemplary host vehicle 101 equipped for collision avoidance and mitigation may include a plurality of radar sensor data collectors 110a. As shown in FIG. 2, the plurality of radar sensors may provide a plurality of detection fields DF surrounding the host vehicle 101. In the example shown in FIG. 2, the radar sensors 110a provide nine detection fields DF1-DF9. In combination, the detection fields DF of the plurality of radar sensors data 110a may cover, for example, three lanes of traffic including areas to the front left, front center, front right, left, right, rear left, rear center and rear right of the host vehicle 101. Each of the radar sensors 110a could be capable of measuring a distance, velocity and other characteristics of vehicles and other obstacles in their respective detection fields DF.

As further shown in FIG. 2, a space surrounding the host vehicle 101 may be divided into a plurality of spatial zones 170. The plurality of spatial zones 170 may include, for example, eight spatial zones 170a-170h. The computer 106 may, based on data 115 received regarding objects detected in the detection fields DF, determine characteristics of the objects in the spatial zones 170. Table 1 below indicates the location of the spatial zones 170 relative to the exemplary host vehicle 101, and the detection fields DF associated with each spatial zone 170, for the exemplary host vehicle 101 as shown in FIG. 2.

TABLE 1

| Spatial Zone | Location relative to Host vehicle 101 | Associated Detection Fields |
| --- | --- | --- |
| 170a | Front left | DF1 |
| 170b | Front center | DF2 |
| 170c | Front right | DF3 |
| 170d | Left | DF4, DF6 |
| 170e | Right | DF5, DF9 |
| 170f | Rear right | DF6, DF7 |
| 170g | Rear center | DF7, DF8 |
| 170h | Rear right | DF8, DF9 |

Figure 3:
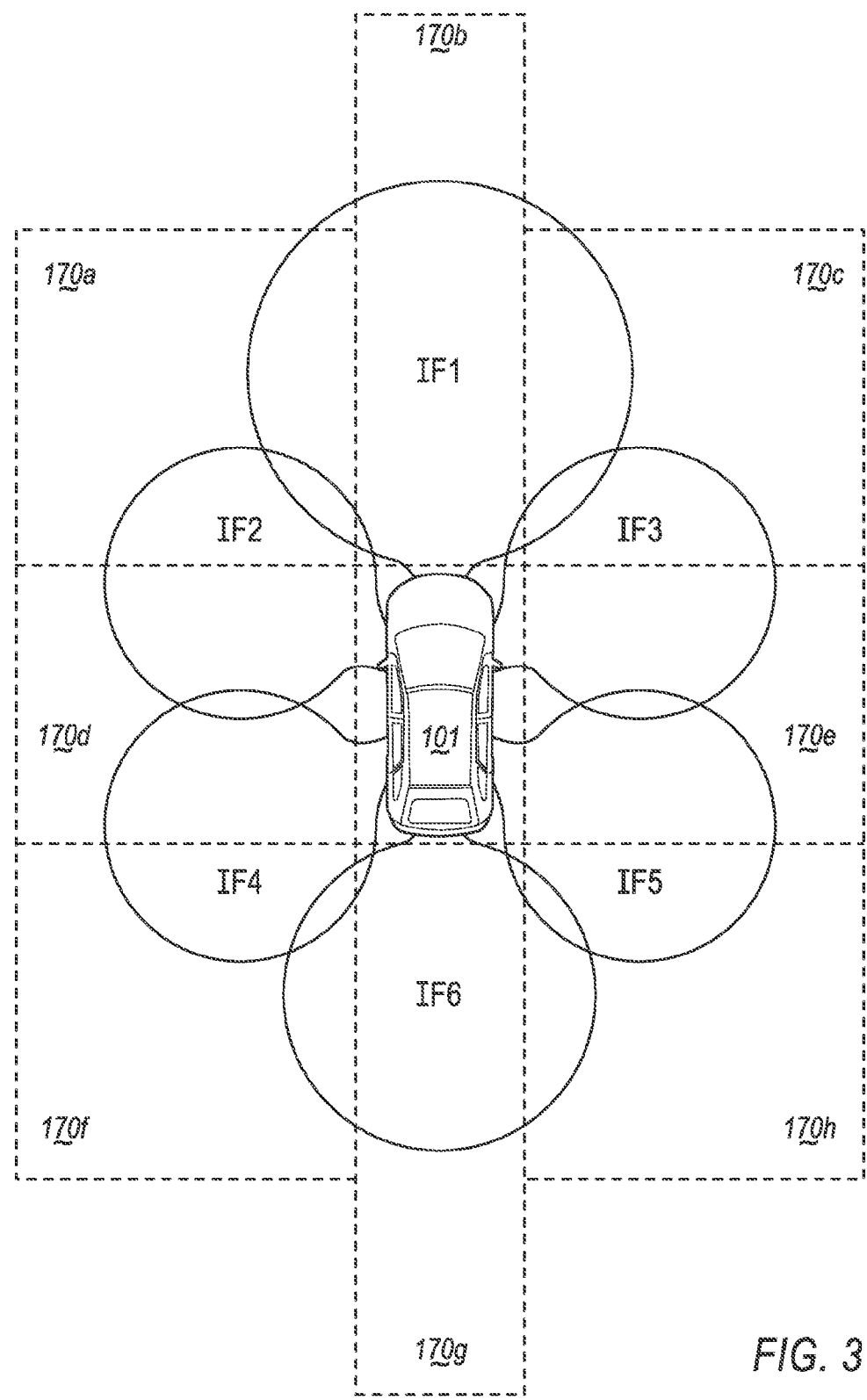
FIG. 3 is a top view of an exemplary vehicle equipped for collision avoidance and damage mitigation illustrating exemplary image detection fields.

The exemplary host vehicle 101 may further include a plurality of camera data collectors 110b. As shown in FIG. 3, the plurality of camera data collectors 110b may provide a plurality of image fields IF surrounding the host vehicle 101. In combination, the image fields of the plurality of video cameras 110b may provide images of objects and vehicles surrounding the host vehicle 101. In the example shown in FIG. 3, the camera data collectors 110b provide six image fields IF1-IF6. The image fields IF of the plurality of camera data collectors 110b, in combination, for example, cover areas to the front center, left, right, and rear center of the host vehicle 101. Based on the images, the camera data collectors 110b could be capable of determining a type of a detected vehicle, e.g., automobile, motorcycle, truck, etc. The camera data collectors 110b may further be capable of discerning and providing information regarding a make and model of the detected vehicle.

As described above in reference to FIG. 2, and also illustrated in FIG. 3, space surrounding the host vehicle 101 may be divided into the plurality of spatial zones 170. The computer 106 may, based on data 115 received regarding objects detected in the image fields IF, determine characteristics of the objects in some or all of the spatial zones 170. The table 2 below indicates the detection fields DF associated with each spatial zone 170, for the exemplary host vehicle 101 as shown in FIG. 3.

TABLE 2

| Spatial Zone | Location relative to Host vehicle 101 | Associated Image Fields |
| --- | --- | --- |
| 170a | Front left | IF1, IF2 |
| 170b | Front center | IF1 |

TABLE 2-continued

| Spatial Zone | Location relative to Host vehicle 101 | Associated Image Fields |
| --- | --- | --- |
| 170c | Front right | IF1, IF3 |
| 170d | Left | IF2, IF4 |
| 170e | Right | IF3, IF5 |
| 170f | Rear left | IF4, IF6 |
| 170g | Rear center | IF6 |
| 170h | Rear right | IF5, IF6 |

As shown in FIG. 3, the image fields IF may only cover limited portions of the spatial zones 170a, 170c, 170f, 170h located diagonally from corners of the host vehicle 101. It may be that information received from the radar sensor data collectors 110a is sufficient for the spatial zones 170a, 170c, 170f, 170h. Other coverage areas of the combined image fields IF of the camera data collectors 110b may also be used. For example, image fields of the video cameras 110b may be limited to directly in front of and directly behind the host vehicle 101.

A precise location on the host vehicle 101 of the data collectors 110, including the radar sensor data collectors 110a and the camera data collectors 110b, is not necessarily critical, so long as the host vehicle 101 is equipped with data collectors 110, e.g., radar data collectors 110a and camera data collectors 110b, sufficient to cover an area around the host vehicle 101 to detect vehicles and obstacles. The radar sensor data collectors 110a and camera data collectors 110b on the host vehicle 101 are generally configured to provide information about a location of an obstacle or other vehicles relative to the host vehicle 101, and additional information such as a velocity and a type of the other vehicles.

Further, sensors or the like, global positioning system (GPS) equipment, etc., could be included in a vehicle and configured as data collectors 110 to provide data directly to the computer 106, e.g., via a wired or wireless connection. Further, sensors other than radar sensor data collectors 110a, camera data collectors 110b, and the other sensors mentioned above are known and may be used for determining a host vehicle 101 range, range rate, etc., with respect to other vehicles and obstacles.

Based on the collected data 115 from the data collectors 110, the v2x transceiver 111, the control units 125, other sensors such as a global positioning system, the computer 106 may construct the virtual map. The virtual map may be a multidimensional matrix of data representing an environment in which the host vehicle 101 is operating, and may include such collected data 115 as the velocity, range, range rate, identity, etc. of objects proximate to the host vehicle 101. The virtual map may be used as a basis for generating a display, determining a risk level of one or more collisions, determining possible collision avoidance maneuvers, determining possible damage mitigation actions, etc.

The host vehicle 101 generally includes a human machine interface (HMI) 120. In general, the HMI 120 is equipped to accept inputs for, and/or provide outputs from, the computer 106. For example, the host vehicle 101 may include one or more of a display configured to provide a graphical user interface (GUI) or the like, an interactive voice response (IVR) system, audio output devices, mechanisms for providing haptic output, e.g., via a host vehicle 101 steering wheel or seat, etc. Further, a user device, e.g., a portable computing device such as a tablet computer, a smart phone, or the like, may be used to provide some or all of an HMI 120 to a computer 106. For example, a user device could be connected to the computer 106 using technologies discussed above, e.g., USB, Bluetooth, etc., and could be used to accept inputs for and/or provide outputs from the computer 106.

Figure 4:
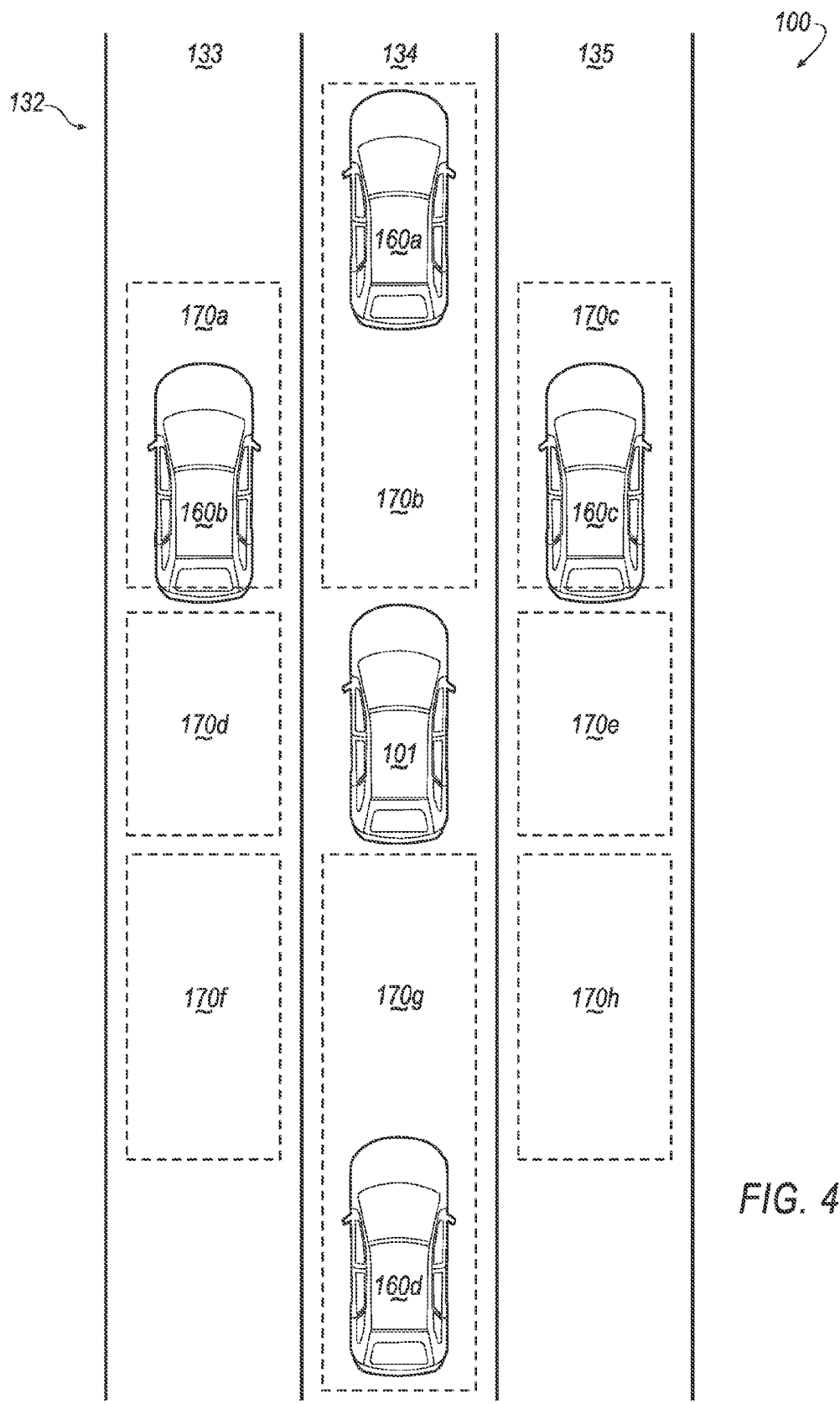
FIG. 4 illustrates an exemplary traffic environment for an exemplary vehicle equipped for collision avoidance and damage mitigation.

FIG. 4 illustrates an example of a driving scenario for the host vehicle 101 with respect to one or more second vehicles 160. A highway 132 has a left lane 133, a center lane 134 and a right lane 135. The host vehicle 101 is positioned in the center lane 134. The driving scenario illustrated in FIG. 4 includes four other vehicles 160 in addition to the host vehicle 101. A front vehicle 160a is positioned in front of the host vehicle 101. A front left vehicle 160b is positioned to the left front of the host vehicle 101. A right front vehicle 160c is positioned to the right front of the host vehicle 101. A rear vehicle 160d is positioned behind the rear of the host vehicle 101.

Figure 5:
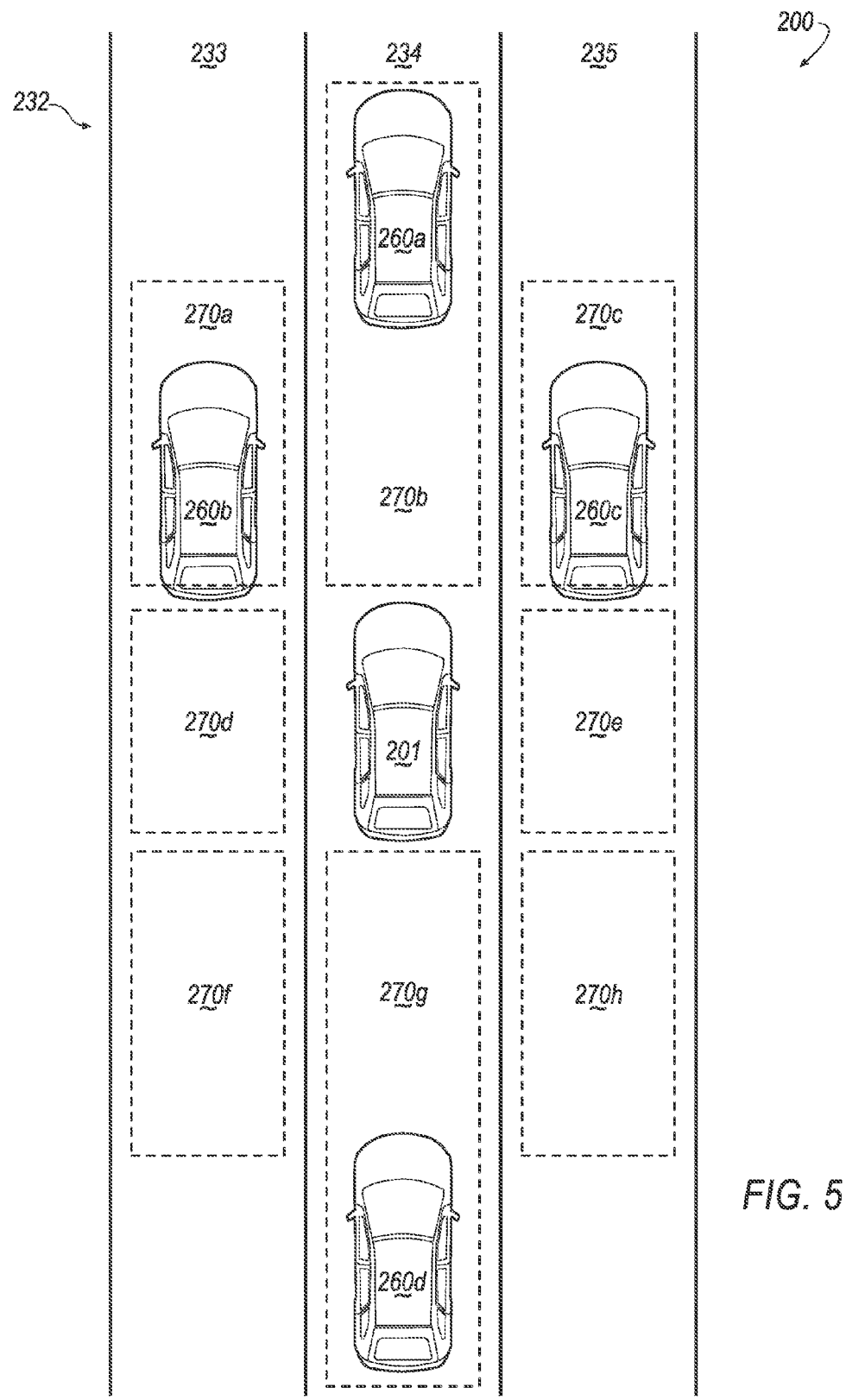
FIG. 5 illustrates an exemplary user display in a vehicle equipped for collision avoidance and damage mitigation.

FIG. 5 illustrates an exemplary user display 200 such as may be provided in an HMI 120 of the host vehicle 101 equipped for collision avoidance and mitigation as disclosed herein. A display, for example on the dashboard, or a heads-up display, may include a vehicle representation 201, a highway representation 232, including a left lane representation 233, a center lane representation 234 and a right lane representation 235. The display may further include a plurality of vehicle representations 260, representing a plurality of second vehicles 160, proximate the host vehicle 101. The display may further include zone indicators 270 around the vehicle representation 201, representing actual spatial zones 170 around the host vehicle 101.

The vehicle representations 260 may be positioned on the user display 200 to indicate a position of respective vehicles 160 relative to the host vehicle 101. FIG. 5 shows four representations of vehicles 260a, 260b, 260c, 260d corresponding to the second vehicles 160a, 160b, 160c, 160d in FIG. 4. Driving scenarios used as examples below will be described based on the presence of one or more of the vehicles 160 proximate the host vehicle 101. It is understood that more or fewer vehicles 160 and/or objects may be proximate the host vehicle 101 during a driving operation. Proximate to the vehicle 101 could be defined, for example, as within a range of 5 meters from the left and right sides of the vehicle (zones 170d, 170e of FIG. 4), 25 meters in front of and behind the vehicles on the left and right sides (zones 170a, 170c, 170f, 170h of FIG. 4), and 50 meters from the vehicle directly in front of and behind the vehicle (zones 170b, 170g). Other distances could be used to define the range within which vehicles and obstacles are determined to be proximate the host vehicle 101. Further, the defined range could be variable, depending, for example, on the speed of the host vehicle 101.

The zone indicators 270 indicate spatial zones 170 around the host vehicle 101. For example, computer 106 may generate eight zone indicators 270 representing respectively the eight spatial zones 170. The zone indicators may include a front-left zone indicator 270a, a front-center zone indicator 270b, a front-right zone indicator 270c, a left zone indicator 270d, a right zone indicator 270e, a left-rear zone indicator 270f, a rear zone indicator 270g and a right-rear zone indicator 270h. The eight zone indicators may respectively represent a front-left zone 170a, a front-center zone 170b, a front-right zone 170c, a left zone 170d, a right zone 170e, and left-rear zone 170f, a rear-center zone 170g and a rear-right zone 170h.

The zone indicators 270 may be used only to display potential escape routes in the case of increased collision risk. When the computer 106 determines that there is relatively low risk of a rear collision based on the data 115 and/or virtual map, the computer 106 may not include the zone indicators in the display 200, and may only show the representation of the highway 232 and the vehicle representations 260 of the vehicles 160 proximate the host vehicle 101.

When the computer 106 determines, based on the data 115 and/or virtual map that there is an increased risk of a collision, the computer 106 may display one or more of the zone indicators 270 on the display 200. The zone indicators 270 may be highlighted, e.g., using shading, color or the like, to indicate zones 170 where a collision is likely to take place, and/or zones 170 recommended as escape routes. For example, during a driving operation a zone indicator 270 may be shaded darker, or color coded, to indicate either an increased collision risk in the corresponding zone, or that the corresponding zone is not a suitable escape route. For example, a zone indicator 270 displayed in yellow could indicate an increased risk of a collision in the corresponding zone 170. A zone indicator 270 displayed in red could indicate that a collision is imminent in the corresponding zone 170 or that no escape is possible in that zone. A zone indicator 270 displayed in green could indicate that the corresponding zone is a potential escape route. Instead of colors, graded shades of gray, etc. could be used. An imminent collision is defined herein as a collision that will occur if no collision avoidance maneuver is undertaken.

For example, in a first scenario, based on the data 115 and/or virtual map, the computer 106 may determine that a front collision of the vehicle 101 with the front vehicle 160*a* is imminent. The computer 106 may determine that the front collision is imminent, for example, if a front range $R_F$ between the vehicle 160*a* and the host vehicle 101 is less than a minimum stopping distance $D_{min}$. The minimum stopping distance $D_{min}$ could be determined as the distance required to stop the host vehicle 101 when a maximum braking level is applied, plus a distance travelled by the vehicle 101 during a standard reaction time of a driver to visual or audio information. Maximum braking or maximum brakes, as used herein may be the braking resulting from maximum specified brake pressure being applied to each respective brake cylinder within the host vehicle 101. In a case that the vehicle 101 is autonomously or semi-autonomously operated, the minimum stopping distance $D_{min}$ could be determined based on the distance required for stopping the host vehicle 101 when a maximum braking level is applied, and the driver reaction time could be omitted. Other approaches for determining that a front collision is imminent are possible.

The computer 106 may further determine that, due to an imminent front collision, a rear collision is also imminent. For example, the computer 106 may determine that, during the braking of the host vehicle 101, based on a standard driver reaction time, the rear vehicle 160*d* will collide with the host vehicle 101 before maximum braking of the rear vehicle 160*d* reduces the speed $V_R$ of the rear vehicle 160*d* to the speed $V_H$ of the host vehicle 101. Other approaches for determining that a rear collision is imminent are possible.

The computer 106 may further determine that a side escape route is available through the front left zone 170*a*, but that no escape route is available through the right front zone 170*c* due to the presence of the right side vehicle 160*c*. In this example, the computer 106 may display each of the front zone indicator 270*b*, the right front zone indicator 270*c*, the right side zone indicator 270*e*, and the rear zone indicator 270*g*, e.g., in red. The computer 106 may further display the front left zone indicator 170*a* and left side zone indicator 270*d* in, e.g., green to indicate a potential escape route to the left.

In some cases, the computer 106 may determine that, based on the data 115 and/or virtual map, both a front and rear collision are unavoidable. A collision could be defined as unavoidable if the computer 106 cannot determine a collision avoidance maneuver available that would prevent the collision.

For example, in a second scenario the computer 106 may determine that the front vehicle 160*a* is decelerating quickly. Simultaneously, the rear vehicle 160*d* is travelling close behind, e.g., within five meters or less, the host vehicle 101 and at a speed $V_R$ similar to, e.g., within 3 kilometers per hour, of, the speed $V_H$ of the host vehicle 101. The left side vehicle 160*b* and the right side vehicle 160*c* block potential side escape routes. In this second case, the computer 106 may display the front side zone indicators 270*a*, 270*c* and the side zone indicators 270*d*, 270*e* in red to indicate that no side escape route is available. The computer 106 may display the front zone indicator 270*b*, e.g., in pink and the rear zone indicator 270*g*, e.g., in red to indicate that the host vehicle 101 should take up some of the space available in the front range $R_F$ before braking, in order to mitigate the damage of the front and rear collisions.

In a third scenario, the computer 106 may determine that, based on the data 115 and/or virtual map, a rear collision is imminent due to the rear vehicle 160*d* approaching from the rear of the host vehicle 101 at a relatively high speed $V_R$. The determination could be made based on a combination of the rear range RR between the rear vehicle 160*d* and the host vehicle 101, and the difference between the rear vehicle speed $V_R$ and the host vehicle speed $V_H$. As one example, the computer may determine that a rear collision is imminent if the rear vehicle 160*d* is approaching the host vehicle 101 with a speed $V_R$ 32 KPH (Kilometers Per Hour) higher than the host vehicle speed and a rear range RR less than 30 meters.

The computer 106 may further determine that there is no vehicle in front of the host vehicle 101, and also no vehicle to the front left of the host vehicle 101. In this case, the computer 106 may display the front side zone indicator 270*a* and the front zone indicator 270*b* in green, and the rear zone indicator 270*g* in red. This may be an indication that the driver of the host vehicle 101 should steer to the left, and also accelerate.

In addition to, or instead of shaded or colored zone indicators 270, the display 200 may indicate an escape route with an arrow. For example, in the first scenario mentioned above of an imminent rear collision, and an open path for the host vehicle 101 to the left front, the display may indicate an escape route with a green arrow pointing forward, and toward the left lane 203. Other indicators and symbols may also be used.

The computer 106 may be configured to provide an instruction to one or more control units 125 of the host vehicle 101 to avoid or mitigate the risk of an imminent collision, or mitigate the damage of an unavoidable collision.

For example, in the first scenario described above wherein both the front and rear collisions are imminent, and there is a potential escape route to the left of the vehicle 101, the computer 106 may determine that there is enough clearance between the front vehicle 160*a* and the host vehicle 101 for a turning maneuver. The computer 106 may then send an instruction to the steering control unit 125*b* to steer the host vehicle 101 to the left. If, for example, the computer had determined that there was not enough clearance for a turn maneuver, the computer 106, may send an instruction to braking control unit 125*a* to brake for a period of time sufficient to create clearance to turn. Thereafter, the computer 106 may send an instruction to the steering control unit 125b to turn according to the available clearance, i.e., in this example, to the left.

In the second scenario described above, wherein the computer 106 determines that both a front collision with the vehicle 160a and a rear collision with the vehicle 160d are unavoidable, the computer 106 may instruct the braking unit 125a to brake the host vehicle 101 at a level less than a maximum level, and/or less than a level requested by a driver, thereby to center the host vehicle 101 between the front vehicle 160a and the rear vehicle 160d prior to the front and rear collisions. Alternatively, if, for example, based on data 115 and/or virtual map, the computer determines that the rear vehicle 160d poses greater risk than a front vehicle 160a, e.g., is a large truck, where the front vehicle 160a is a passenger vehicle, the computer 106 may instruct the brake control unit 125a to brake the vehicle at a minimal level or not at all in order to maintain a relatively large rear range RR between the host vehicle 101 and the rear vehicle 160d for a longer period of time prior to the unavoidable collision. This may give the rear vehicle 160d additional time to brake prior to the collision, which may reduce an overall severity of the front and/or rear collisions.

Other responses to the second scenario are also possible. For example, based on data 115 and/or virtual map, the computer 106 may determine that it would be advantageous for the rear collision to occur before the front collision. For example, the rear vehicle 160d may be smaller than the front vehicle 160a, allowing a braking action of the host vehicle 101 after occurrence of the rear collision to also reduce the speed of the rear vehicle 160d. The computer 106 may initially instruct the braking unit 125a to brake the host vehicle 101 at a level less than the maximum level until a rear collision is detected. The computer 106, based on the data 115 and/or virtual map, may detect that the rear collision has occurred. After detecting that the rear collision has occurred, the computer 106 may instruct the braking unit 125a to brake the host vehicle 101 at a maximum level, in order to reduce a severity of the front collision.

The computer 106 may further instruct the steering control unit 125b to align the host vehicle 101 with the front vehicle 160a, i.e., for the vehicle 101 to follow a same direction of travel as the front vehicle 160a. Based on the data 115 and/or virtual map, the computer 106 may determine that the host vehicle 101 is traveling at an angle relative to the front vehicle 160a. In order to receive optimal protection from a frame of the host vehicle 101, it may be desirable for directions of travel of the front vehicle 160a and the host vehicle 101 to be aligned, i.e., substantially the same as one another. The computer 106 may determine the direction of travel of the front vehicle 160a and adjust the direction of travel of the host vehicle 101 to correspond to the direction of travel of the front vehicle 160a.

As another alternative, the computer 106 may instruct the braking unit 125a to align the host vehicle 101 with the front vehicle 160a by differential braking. For example, in order to turn the host vehicle 101 to the left in order to align the host vehicle 101 with the front vehicle 160a, the braking unit 125a may apply brakes at a first level on the left side of the host vehicle 101 and at a second level on the right side of the host vehicle 101, the first brake level being higher than the second brake level.

Further, if the computer 106, based on the data 115 and/or virtual map determines that the vehicle 160d approaching from the rear is a truck with an elevated front bumper relative to a rear bumper of the host vehicle 101, the computer 106 may instruct the suspension controller 125c to raise the rear suspension of the host vehicle 101 to adjust a height of the rear bumper to correspond with a height of the front bumper of the vehicle 160d. The computer 106 may activate other control units. For example, the computer 106 may send an instruction to a seat belt control unit 125e to pretension seat belts prior to the front and rear collisions.

In the third scenario cited above, wherein the rear vehicle 160d is approaching quickly, and there is no vehicle to the front left of the host vehicle 101 or in front of the host vehicle 101, the computer 106 could instruct the powertrain control unit 125d to increase the propulsive torque at the host vehicle 101 wheels in order to accelerate the host vehicle 101 and further instruct the steering control unit 125b to steer the host vehicle 101d to the left.

The computer 106 may determine, based on the data 115 and/or virtual map that the front vehicle 160a is decelerating. The computer 106, could further determine, that a rear range RR between the rear vehicle 160d and the host vehicle 101 is less than or equal to a first predetermined range. The first predetermined range may be for example, two times a standard following distance, wherein the standard following distance is 5 meters for each 16 KPH of speed of the rear vehicle 160d.

First Braking Strategy

Figure 6:
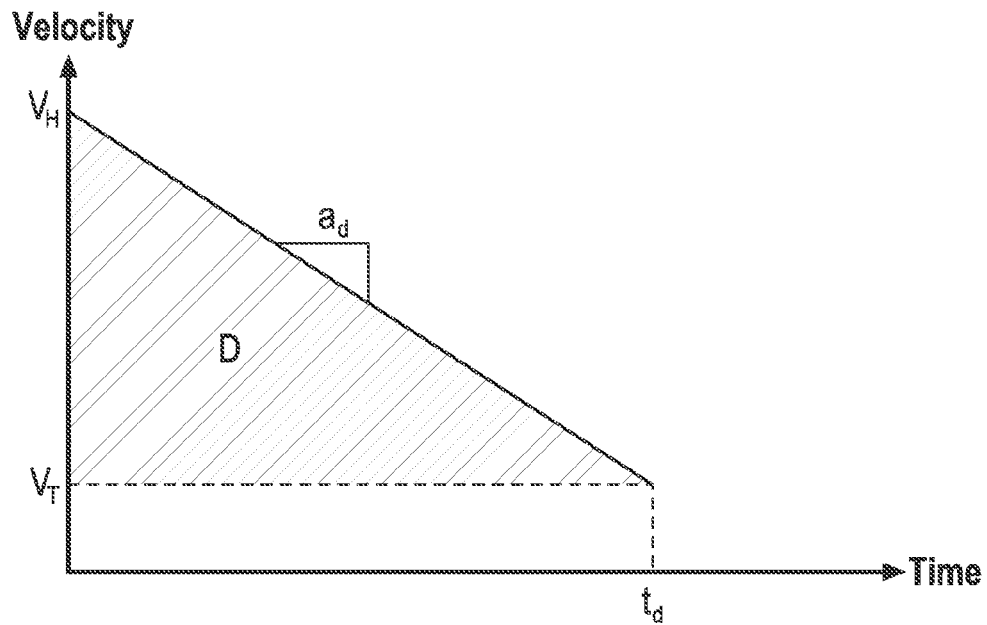
FIG. 6 is an exemplary graph of vehicle velocity versus time during a first braking strategy.

With reference to the graph illustrated in FIG. 6, the computer 106 may determine a deceleration as for the host vehicle 101 according to a first braking strategy, based on a front range $R_F$ of the front vehicle 160a to the host vehicle 101, a front vehicle speed $V_T$ and a host vehicle speed $V_H$. The computer 106 may instruct the braking unit 125a to brake the host vehicle 101 according to the determined deceleration rate $a_d$.

The computer 106 may calculate a deceleration distance D based on the front vehicle range $R_F$ and a minimum stopping distance $D_{min}$. The deceleration distance D may be calculated to be the difference of the front range $R_F$ and the minimum stopping distance $D_{min}$.

$$D = R_F - D_{min} \qquad \text{Equation 1}$$

The computer 106 may further determine a time $t_d$ required to brake within the distance D as:

$$t_d = (2*D)/(V_H - V_T) \qquad \text{Equation 2}$$

The computer 106 may calculate the deceleration rate $a_d$ such that the host vehicle 101 is decelerated to the front vehicle 160a speed $V_T$ within the deceleration distance D as:

$$a_d = (V_H - V_T)/t_d = (V_H - V_T)^2/(2*D) \qquad \text{Equation 3}$$

Deceleration according to the first braking strategy has the advantage of smoothly decelerating the host vehicle 101 utilizing all available deceleration distance D and avoiding abrupt deceleration.

Second Braking Strategy

Figure 7:
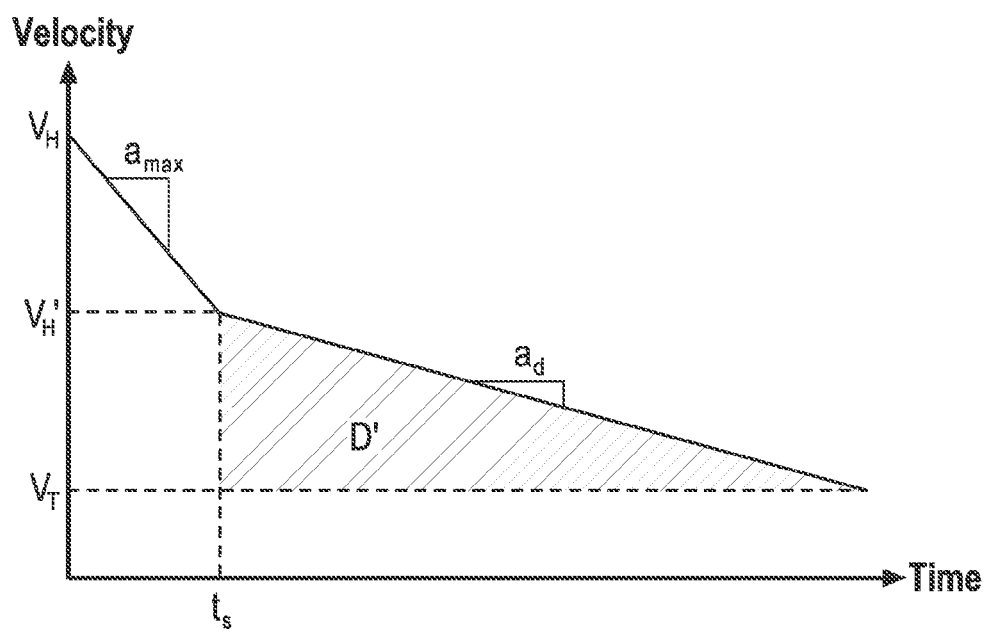
FIG. 7 is an exemplary graph of vehicle velocity versus time during a second braking strategy.

In some cases, the computer 106 may determine that a second braking strategy, wherein the host vehicle 101 is first braked at a high or maximum level for a predetermined period of time, and then braked at a lower level is preferable for the traffic conditions. This second strategy is illustrated in the graph of FIG. 7.

The computer 106 may determine, based on the data 115 and/or virtual map, that the front vehicle 160a is decelerating. The computer 106, could further determine, that the rear range RR between the rear vehicle 160d and the host vehicle 101 is greater than the first predetermined range, and less than or equal to a second predetermined range. The first predetermined range could be 2 times the standard following distance as described above. The second predetermined range could be, for example, 4 times the standard following distance. Alternatively, the second predetermined range could be the limit of the radar detection fields DF7, DF8 behind the host vehicle 101.

According to the second braking strategy, the computer 106 could initially instruct the brake control unit 125a to brake the vehicle 101 at a maximum braking level to achieve a maximum deceleration $a_{max}$ for a predetermined time $t_s$. The predetermined time could be, for example, 1 second. With reference to the graph of FIG. 7, after the time $t_s$, a front range $R_F$ between the front vehicle 160a and the host vehicle 101 could be D'. The deceleration $a_d$ could be calculated as described according to the first strategy, wherein D' is substituted for D:

$$a_d = (V_H' - V_T)/t_d = (V_H' - V_T)^2/(2*D'). \qquad \text{Equation 4}$$

As described above, the second braking strategy begins with a period of high or maximum deceleration $a_{max}$. This has the advantage of further preserving the front range $R_F$ between the front vehicle 160a and the host vehicle 101. Preserving the front range $R_F$ provides additional clearance for collision avoidance maneuvers such as turning to the left or right, in the event that such a maneuver becomes necessary. A period of maximum deceleration has the further advantage of being more easily noticeable by a driver of the rear vehicle 160d, and alerting the driver of the rear vehicle 160d that the host vehicle 101 is decelerating.

Third Braking Strategy

In other instances, when there is no vehicle within the second predetermined range behind the vehicle 101, the computer 106 may implement a third braking strategy. The computer 106 may wait until the vehicle 101 is within a range D" to initiate braking. The third strategy is illustrated in the graph of FIG. 8.

The computer 106 may determine that the front vehicle 160a is decelerating. The computer 106 may further determine that there is no rear vehicle within the second predetermined range, as described above. The computer 106 may allow the host vehicle 101 to continue until it is within the range D" of the front vehicle 160a.

The distance D" can be determined based on a predefined preferred deceleration $a_{pref}$, and a minimum stopping distance $D_{min}$. The maximum deceleration $a_{pref}$ may be determined empirically as the maximum deceleration with which a large percentage (e.g., 95%) of drivers and passengers are comfortable. Other criteria for determining $a_{pref}$ may be used. $D_{min}$ can be the minimum stopping distance required to stop the host vehicle 101, as described above.

Figure 8:
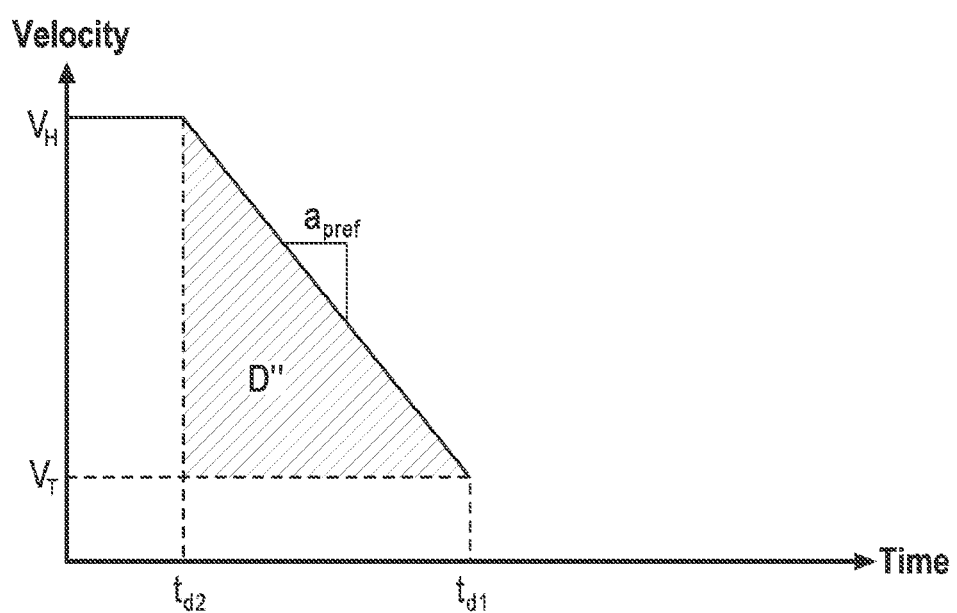
FIG. 8 is an exemplary graph of vehicle velocity versus time during a third braking strategy.

Referring to FIG. 8, the distance D" may be calculated according to the following equation:

$$D" = ((V_H - V_T)*(t_{d1} - t_{d2})/2)D_{min}; \qquad \text{Equation 5}$$

wherein $t_{d2}$ is the start time of deceleration, $t_{d1}$ is the end time of deceleration, $V_H$ is the speed of the host vehicle 101 before deceleration, and $V_T$ is the speed of the front vehicle 160a.

The predefined parameter $a_{pref}$ may be substituted into equation 5 as follows:

$$(t_{d1} - t_{d2}) = (V_H - V_T)/a_{pref} \qquad \text{Equation 6}$$

$$D" = ((V_H - V_T)^2/(2*a_{pref})) + D_{min} \qquad \text{Equation 7}$$

According to the above, the desired deceleration $a_d$ according to strategy 3 may be defined as:

$$a_d = (V_H - V_T)^2/2*D" \text{ for the front range } R \leq D" \text{ and}$$

$$a_d = 0 \text{ otherwise} \qquad \text{Equation 8}$$

Exemplary Process Flows

Figure 9:
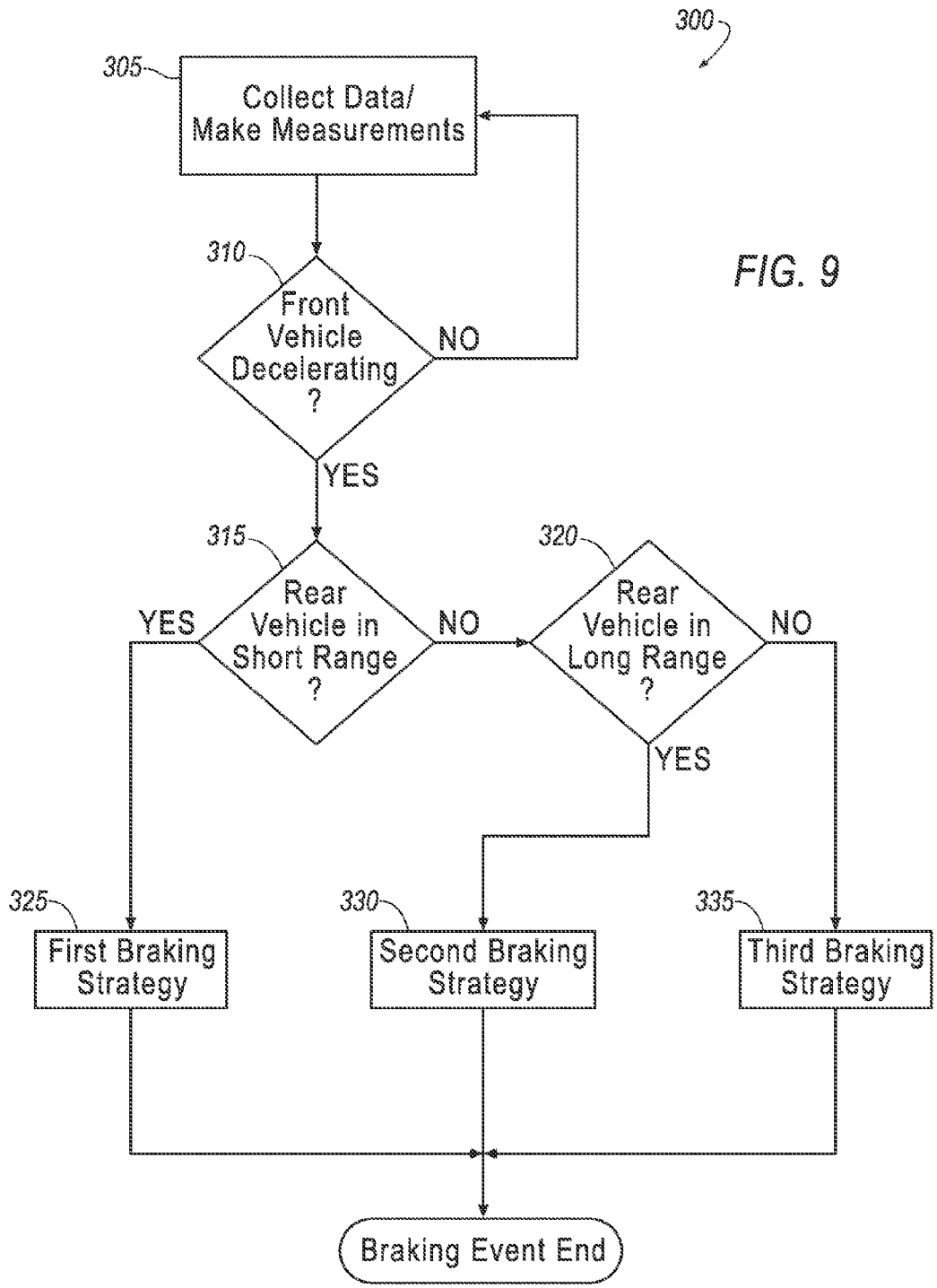
FIG. 9 is a diagram of an exemplary process for collision avoidance.

FIG. 9 is a diagram of an exemplary process 300 for collision avoidance and/or collision damage mitigation. The process 300 begins in a block 305, in which data is collected regarding a current traffic situation for a host vehicle 101. The computer 106 obtains and/or generates collected data 115. For example, collected data 115 may be obtained from one or more data collectors 110, as explained above. Further, collected data 115 may be computed from other data 115 obtained directly from a data collector 110. In any event, in the block 305, collected data 115 obtained by the computer 106 may include a distance of the host vehicle 101 from other vehicles 160 and/or objects, velocities for the other vehicles 160, accelerations of other vehicles 160, velocities of the other vehicles relative to the host vehicle 101, such data 115 being obtained via one or more radar sensor data collectors 110a.

As mentioned above, in addition to data 115 from radar sensors 110a, a variety of other data 115 may be obtained. For example, image data 115 relating to the type, make, model of other vehicles 160 proximate to the host vehicle 101 may be obtained from the camera data collectors 110b, data 115 relating to host vehicle 101 velocity, direction of travel, etc., may be obtained from the control units 125, and other host vehicle 101 controllers and sensors. Upon collecting and generating the data 115, the computer 106 may generate a virtual map as described above. The process continues in a block 310.

In the block 310, the computer 106 determines, based on the collected data 115 and/or virtual map, if a front vehicle 160a is present, and if the front vehicle 160a is decelerating. If the front vehicle 160a is present and decelerating, the process 300 continues in a block 315. Otherwise, the process 300 continues in the block 305.

In the block 315, the computer 106 determines whether there is a rear vehicle 160d within a short range. For example, the short range may be defined as less than or equal to a first predetermined distance. The first predetermined distance, may be, for example, two times a standard following distance, as discussed above. In the case that the there is a rear vehicle 160d within the short range, the process 300 continues in a block 325. In the case where there is not a rear vehicle 160d within the short range, the process continues in a block 320.

In the block 320, the computer 106 determines whether there is a rear vehicle 160d travelling within a long range. For example, the long range may be defined as greater than the short range, and less than or equal to a second predetermined distance. The second predetermined distance may be, for example, four times the standard following distance, and discussed above. In the case where there is a rear vehicle 160d in the long range, the process continues in a block 330. In the case where there is not a rear vehicle 160d within the long range, the process continues in a block 335.

In the block 325, which may follow the block 315, the computer 106 implements a first braking strategy as described above. After braking, the process 300 ends.

In the block 330, which may follow the block 320, the computer 106 implements a second braking strategy as described above. After braking, the process 300 ends.

In the block 335, the computer 106 implements a third braking strategy as described above. After braking, the process 300 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer comprising a processor and a memory, wherein the computer is programmed to:
   use data collected from host vehicle sensors to generate a virtual map of objects proximate to the host vehicle on at least a front side and a rear side;
   determine, based on the virtual map, that a front collision and a rear collision will occur;
   receive, from a user, a request for braking at a first level;
   determine one or more damage mitigation actions based on the determination that the front collision and rear collision will occur, and
   send instructions to one or more control units to execute respective damage mitigation actions, wherein the instructions include braking at a second level less than the first level.

2. The system of claim 1, wherein the computer is further programmed to use data collected from at least one of vehicle-to-vehicle and vehicle-to-infrastructure communications to generate the virtual map.

3. The system of claim 1, wherein the computer is further programmed to:
   provide a display based on the virtual map that indicates at least one of the one or more damage mitigation actions.

4. The system of claim 1, wherein the damage mitigation action includes braking at a braking level that is less than the lower of a maximum level and a level requested by a driver.

5. The system of claim 1, wherein the damage mitigation action includes:
   braking at a level less than a maximum level;
   detecting that the rear collision has occurred; and
   upon detecting that the rear collision has occurred, braking at the maximum level.

6. The system of claim 1, wherein the damage mitigation actions include braking at less than a maximum level.

7. The system of claim 1, wherein the damage mitigation actions include aligning the host vehicle with a front vehicle, in front of the host vehicle.

8. The system of claim 1, wherein the damage mitigation actions include pretensioning a seat belt.

9. The system of claim 1, wherein the collected data includes the type of a rear vehicle behind the host vehicle, and,
   the damage mitigation action includes adjusting a rear height of the host vehicle such that a height of a rear bumper on the host vehicle is substantially equal to a height of a front bumper of the rear vehicle.

10. A system comprising a computer comprising a processor and a memory, wherein the computer is programmed to:
   use data collected from host vehicle sensors to generate a virtual map of objects proximate to a vehicle;
   determine, based on the virtual map, that a front collision and a rear collision will occur;

determine one or more damage mitigation actions based on the determination that the front collision and the rear collision will occur;

send instructions to one or more control units to execute respective damage mitigation actions, the damage mitigation actions including:

braking at a first level less than a maximum level;

detecting that the rear collision has occurred, and upon detecting the rear collision has occurred, braking at the maximum level.

11. The system of claim 10, wherein the computer is further programmed to use data collected from at least one of vehicle-to-vehicle communications and vehicle-to-infrastructure communications to generate the virtual map.

12. The system of claim 10 wherein the damage mitigation actions include aligning the host vehicle with a front vehicle, in front of the host vehicle.

13. The system of claim 10, wherein the damage mitigation actions include pretensioning a seat belt.

14. A system comprising a computer comprising a processor and a memory, wherein the computer is programmed to:

use data collected from host vehicle sensors to generate a virtual map of objects proximate to the host vehicle on at least a front side and a rear side;

determine, based on the virtual map, that a front collision and a rear collision will occur;

determine one or more damage mitigation actions based on the determination that the front collision and rear collision will occur, and send instructions to one or more control units to execute respective damage mitigation actions, wherein the collected data includes the type of a rear vehicle behind the host vehicle, and the damage mitigation action includes adjusting a rear height of the host vehicle such that a height of a rear bumper on the host vehicle is substantially equal to a height of a front bumper of the rear vehicle.

15. The system of claim 14, wherein the computer is further programmed to use data collected from at least one of vehicle-to-vehicle and vehicle-to-infrastructure communications.

16. The system of claim 14 wherein the damage mitigation actions include aligning the host vehicle with a front vehicle, in front of the host vehicle.

17. The system of claim 14, wherein the damage mitigation actions include pretensioning a seat belt.

18. The system of claim 14, wherein the processor is further programmed to:

receive, from a user, a request for braking at a first level, wherein the instructions include braking at a second level less than the first level.

19. The system of claim 14, wherein the damage mitigation actions include braking at less than a maximum level.

* * * * *